Patented Feb. 27, 1940

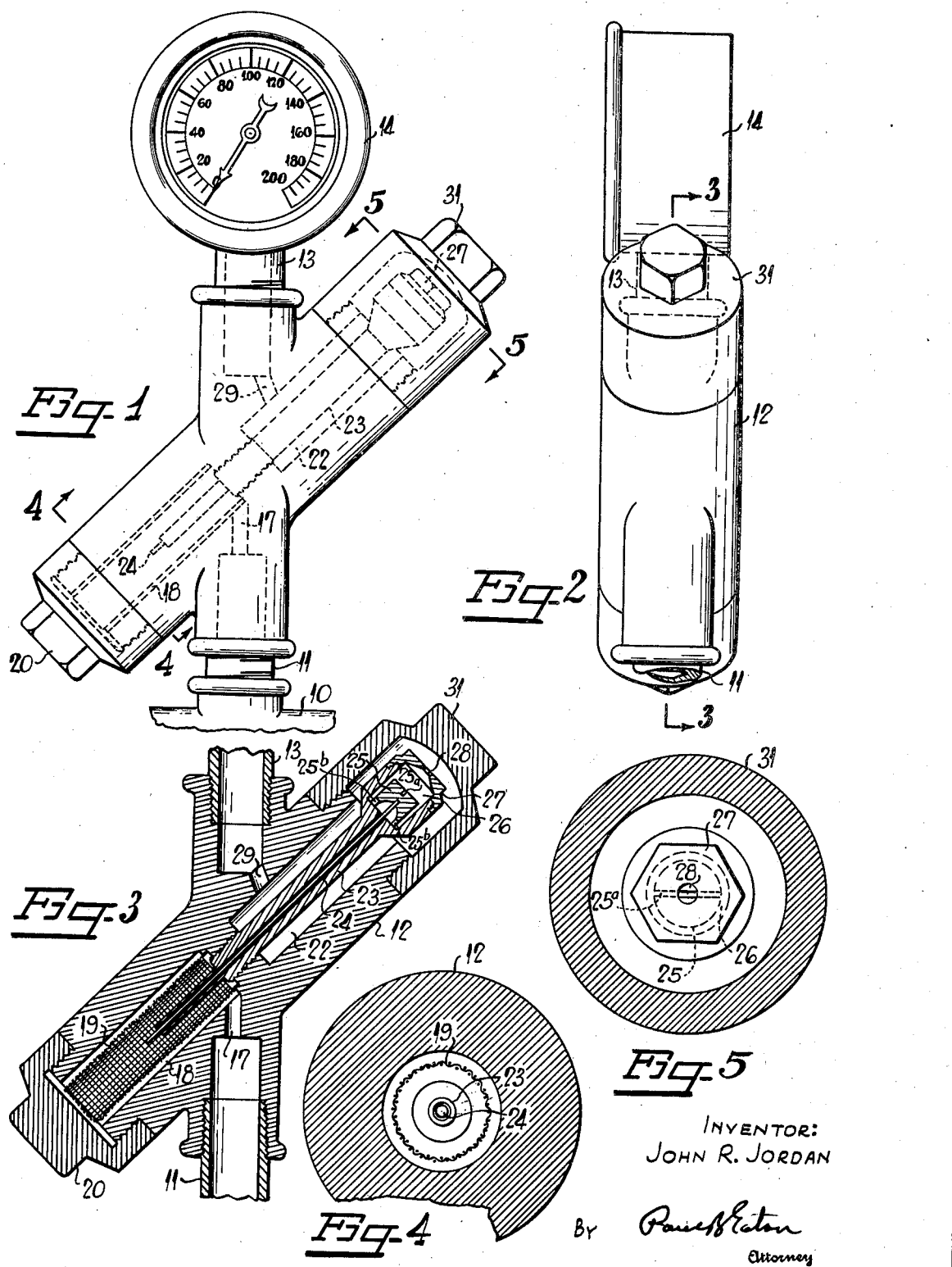

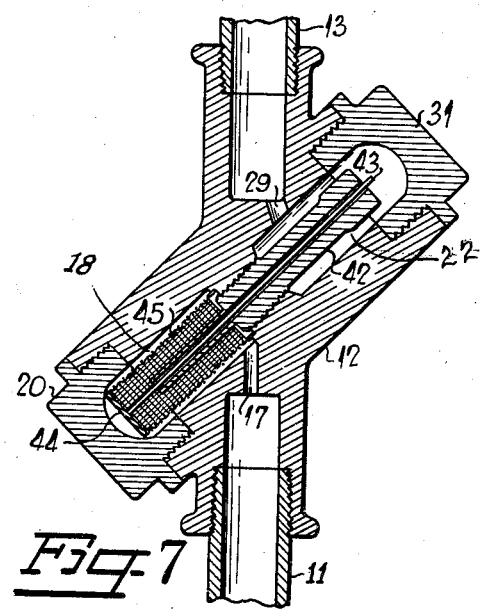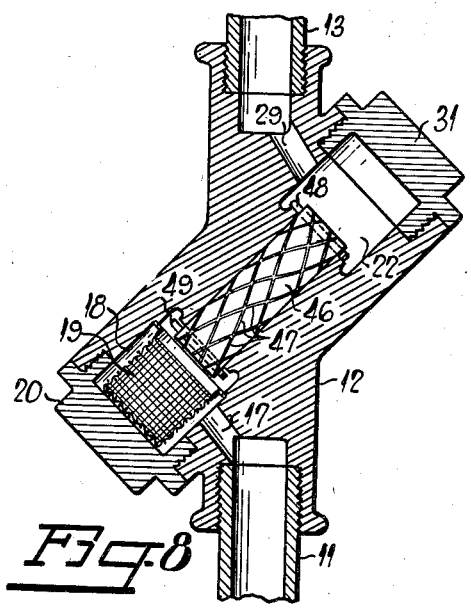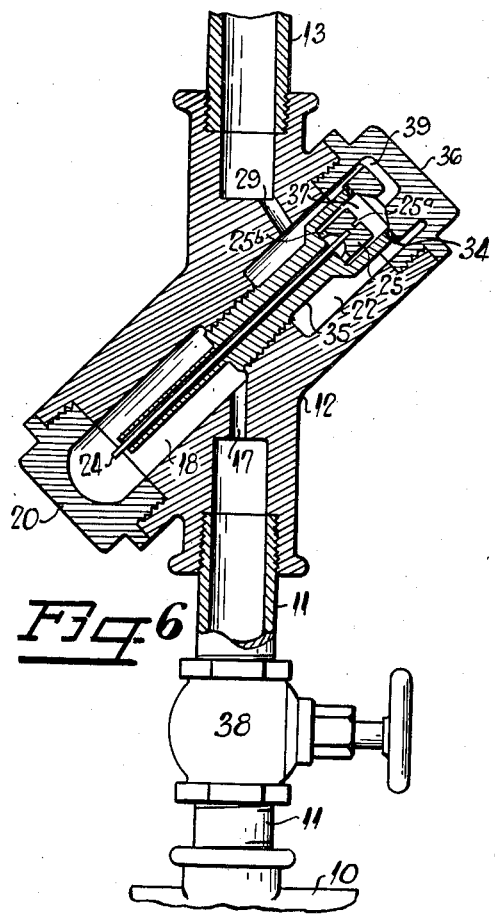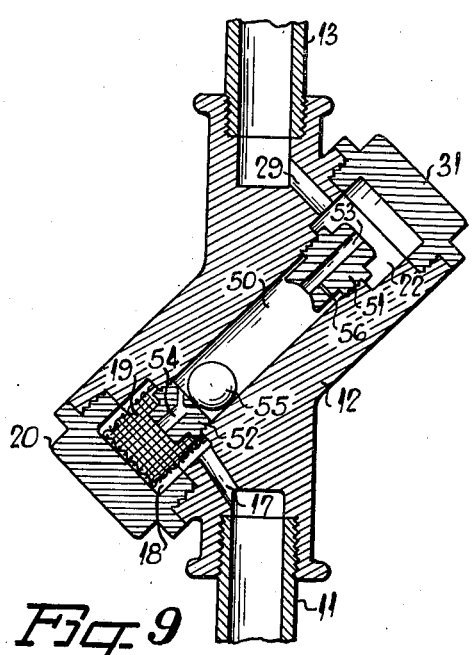

2,191,990

UNITED STATES PATENT OFFICE 2,191,990

SHOCK ABSORBER FOR FLUID PRESSURE LINES

John R. Jordan, Jackson Heights, N. Y.

Application February 15, 1937, Serial No. 125,893

2 Claims. (Cl. 138—26)

This invention relates to a shock absorber for fluid pressure lines and more especially to a shock absorber so constructed that the internal mechanism may be removed or replaced without disturbing the seal of the pipe in which the absorber is installed, and without removing the pressure gauge or other control instrument. Where pressure gauges or other control instruments are installed in lines in which there is a variable fluctuation of pressure they are subjected to the shocks and surges resulting from this variation. Since the gauges are very often constructed of a sensitive mechanism, these shocks frequently occasion serious wear and strain upon the moving parts rendering them inoperative or inaccurate in their readings; therefore, it is necessary to provide a shock absorber which may be disposed between the gauge and the source of pressure which will retard any sudden flow of pressure to the gauge and thereby allow any sudden shock or change in the pressure to be gradually transmitted to the gauge so as to allow the moving parts therein to gradually change their position to indicate the pressure. This shock absorbing means is usually in the form of a constriction in the pipe leading to the gauge. After continued use the constriction very often becomes clogged and prevents the mechanism from operating efficiently.

It is therefore, an object of this invention to interpose a constriction between the gauge and the main pressure line with movable means disposed within said constriction for normally preventing the constriction from becoming clogged with foreign substances, and which movable means are disposed at an intersecting angle to the pipe line leading from the source of pressure to the gauge.

It is a further object of the invention to provide a shock absorber for fluid pressure lines that will be operable and efficient on any range of pressures from zero to maximum, also vacuums, and also on fluids of any consistency through the medium of easy, quick and simple exchange of certain movable parts, without breaking the seal in the main line, that is a shock absorber with sufficient elasticity for universal application.

It is a further object of the invention to provide a shock absorber for fluid pressure lines having a mechanically operated constriction therein, a longitudinal axis of said constriction being disposed at any intersecting angle with the main line of flow. By providing the longitudinal axis of the constriction at an intersecting angle, it is evident that the movable parts which are disposed in the constriction and associated therewith may be easily removed without disturbing the seal of the main line. The constriction as heretofore stated, at times becomes clogged and it is therefore necessary to provide movable means therein for preventing clogging, or to adapt the movable parts to varying pressures, or fluids of different consistencies, temperatures and the like. It is also often necessary to remove this movable member from the constriction for purposes of replacement; however, it is highly desirable not to disturb the seal in the pipe line in which the device is installed.

By so constructing the shock absorber, the life of the gauges or other control instruments is materially prolonged since the shocks and surges will be lessened. Also, the adjustment and interchangeability of the parts in the device may be accomplished without breaking the seal of any of the connecting joints.

Some of the objects of the invention having been stated, other objects will appear as the description proceeds when taken in connection with the accompanying drawings, in which:

Figure 1 is an elevation of the invention attached to a pressure line which connects the main pressure line with a pressure gauge;

Figure 2 is an elevation looking at the right-hand side of Figure 1;

Figure 3 is a vertical, sectional view taken along line 3—3 in Figure 2;

Figure 4 is a cross-sectional view taken along line 4—4 in Figure 1;

Figure 5 is a cross-sectional view taken along line 5—5 in Figure 1;

Figure 6 is a vertical, sectional view showing a slightly modied form of the invention but showing a different seat arrangement at the upper interior portion thereof;

Figure 7 is a vertical sectional view showing another modified form of the invention in which no seat arrangement is provided;

Figure 8 is a view of still another modified form of the invention showing a rotatable swirl disposed in the constriction for the purpose of retarding the sudden flow of pressure;

Figure 9 is a vertical sectional view of still another modified form of the invention in which a ball is loosely mounted in the constriction for regulating the flow of pressure.

Referring more specifically to the drawings, the numeral 10 denotes a main pressure line such as a steam pipe which has connected thereto a pipe 11, said pipe 11 being threadably secured into the lower end of shock absorber housing 12. Pipe 11, as shown in Figure 6, may have a suitable valve 38 therein so the pressure can be relieved on the gauge 14 when it is desired to remove any of the parts of the hereinafter described apparatus.

Threadably secured to the upper end of housing 12 is a second pipe 13 upon which is mounted a pressure gauge 14 for recording the pressure in the pipes. The pressure flows, in the present instance, upwardly from pipe 11 through vertically disposed bore 17 and then into angularly disposed bore 18.

The bore 18 has a strainer or filter 19 disposed therein which prevents foreign substances from gaining access to the gauge 14 thereabove. This strainer may be removed when desired by removing the nut 20 which is threadably secured upon the lower end of housing 12. Another bore 22, which is similar to bore 18, is provided in the upper end of the housing 12. Likewise, bore 18 is disposed at an angle to the longitudinal axis of the pipes 11 and 18.

Secured between the bores 18 and 22 is a tube 23, said tube also having a longitudinal bore therein in which is mounted a sliding pin 24. This pin is somewhat smaller than the bore into which it is adapted to operate to allow the pressure to be transmitted from bore 18 to the bore 22.

The upper end of stem 24 has a head portion 25 secured thereon which head portion normally limits the movement of the stem when in normal position and tends to hold the pin in the position shown against the pressure in the system but causes no error in the true mean pressure. The fluid pressure is transmitted around stem 24 and head 25, into the enlarged bore 26 which is disposed in the upper end of tube 23, or into bore 22 if the device is constructed without bore 26 and cap 27, said bore 26 being normally closed by means of a cap 27, which cap has a small hole 28 in the upper end thereof through which the pressure is transmitted into the bore 22.

It will be noted that the head portion 25 on the upper end of stem 24 has opening 25b in the lower edge thereof and also has a transverse slot 25a therein which allows the fluid to flow from the bore in tube 23 to bore 26 through the hole 28, and vice versa when a sudden shock or surge of pressure forces the pin 24 and its associated parts upwardly to a point where head 25 will engage the lower interior surface of cap member 27 and downwardly upon release of such shock or surge. It is evident, however, that the flow of the pressure through this slot will not be as great as it will be when the parts are in normal position as shown, because of the restricted orifice 25a through which the pressure is then flowing. In normal position the pressure is transmitted through openings 25b and hole 28. After the shock or surge has been reduced, then by virtue of gravity and the reaction to such shock or surge, the moving portions will assume the position shown in Figure 3.

The pressure in bore 22 is transmitted through hole 29 to gauge 14. When it is desired to gain access to stem 24 and its associated parts in the housing 12 without disturbing the seal of the main line, it is only necessary to close valve 38 and unscrew nut 31.

Figure 6 shows a slightly modified form of the invention in which like reference characters will apply to similar parts and only a description will be made of the parts varying in construction from that of the preceding form. In this form a tube 35 is secured in the housing 12 which has its upper end normally closed by cap member 36. A suitable gasket 34 may be provided, or a ground fit may be employed. The movable item 24 having associated head portion 25, is adapted to operate in said tube. The upper end of the tube 35 has a bore 37 which is similar to bore 26 described in the preceding form and this bore communicates with a smaller bore 39 which is cut in the cap member 36. In this form of the invention the cap 36 serves as a closure for the upper end of the bore 22 as well as for the upper end of bore 37. If desired, a suitable valve 38 may be placed in pipe 11 so that the pressure may be cut off and the parts in bores 18 and 22 cleansed or removed without relieving the pressure in main line 10.

Figure 7 shows a combination which is similar to that of the preceding form. A clearing stem or tube 42 is secured at a point between bores 18 and 22, and into this stem is slidably mounted a pin 43. Normally, the lower end of pin 43 is adapted to rest against the end portion 44 of strainer or filter 45 or nut 20, however, when the pressure is suddenly increased the increased velocity of the flow of the fluid around the pin 43 from chamber 18 to chamber 22, will cause the pin 43 to move upwardly and thus counteract any shock or surge, and on its backward stroke thereby tends to keep the constriction or bore in the tube 42 clear and free from foreign matter.

Figure 8 shows still another modified form in which the lower bore 18 is connected to the upper bore 22 by means of a rotatable swirl 46, said swirl having two sets of spirally disposed grooves 47 therein, through which the pressure is adapted to be transmitted from bore 18 to bore 22. These sets of grooves are oppositely directed. Since the combined cross-sectional areas of these grooves are considerably less than the cross-sectional area of any other portion of the line through which the pressure is transmitted, it is evident that there will be a resistance set up to any sudden change of pressure in the line which will protect the gauge 14. The swirl 46 is held in position by means of cotter pins 48 and 49 which penetrate upper and lower ends of swirl 46, or may be allowed to strike against nuts 20 and 31.

Figure 9 shows still another modified form of the invention in which the lower bore 18 is connected to the upper bore 22 by means of an intermediate bore 50, said bore 50 having in its upper and lower ends nuts 51 and 52 respectively, which are secured therein, or may be a fixed part of body 12. The nuts 51 and 52 have restricted bores 53 and 54 respectively therein which will allow the pressure to be transmitted from chamber 18 to chamber 22. The flow of the pressure between these bores however, is limited by a suitable ball 55 which is loosely mounted in the bore 50 and which is normally confined therein by means of the nuts 51 and 52. If desired a member 25 may be used instead of ball 55.

When a sudden surge of pressure takes place in the pipe line the ball 55 is moved upwardly against the lower side of nut 51 which will close the port 53. Since the bore 53 has a smaller bore 56 communicating therewith and leading to the chamber 50 it is seen that the flow of the pressure into chamber 22 is not entirely stopped. But instead, it is decreased to such an extent that the shock in the line therebeyond will not be as great as the shock in the main line. Therefore, the instrument or indicator 14 will not be suddenly actuated.

It is therefore, seen that I have provided a shock absorber for fluid pressure lines, which has a constriction therein having a movable member for keeping the same in an operable condition, with means for removing or cleaning the parts within the casing of the shock absorber at all times without disturbing the seals in the pipe line in which the shock absorber is installed.

In the drawings and specification there has been set forth a preferred embodiment of the invention, and although specific terms are employed, they are used in a generic and descriptive sense only, and not for purposes of limitation, the scope of the invention being set forth in the appended claims.

I claim:

1. A shock absorber for a fluid pressure line comprising a cylindrical casing disposed in said line and having its longitudinal axis disposed at an intersecting angle to the said line, said casing having a pair of alined cylindrical bores therein connected at their proximate ends by a smaller threaded bore, a pipe having its lower portion threadably mounted in said threaded bore and having a constriction extending longitudinally of the same, said pipe having an enlarged cavity in its upper end, a cap member threadably secured on the upper end of said pipe and having a hole disposed centrally thereof, a clearing stem mounted for movement in said constriction and having a head on the upper end thereof provided with a transverse slot in its upper surface, said head being adapted to engage said cap when the stem is moved upwardly in said constriction, said casing having a port communicating with one side of the line and the lower of said cylindrical bores and also having another port communicating with the upper of said cylindrical bores and the other side of said line.

2. A shock absorber for a fluid pressure line comprising a cylindrical casing disposed in said line and having its longitudinal axis disposed at an intersecting angle to the said line, said casing having a pair of alined cylindrical bores therein connected at their proximate ends by a smaller threaded bore, a pipe having its lower portion threadably mounted in said threaded bore and having a constriction extending longitudinally of the same, said pipe having an enlarged cavity in its upper end, a means for closing the upper end of said pipe and having a hole disposed centrally thereof, a clearing stem mounted for movement in said constriction and having a head on the upper end thereof provided with a transverse slot in its upper surface, said head being adapted to engage said means for closing the upper end of said pipe when the stem is moved upwardly in said constriction, said casing having a port communicating with one side of the line and the lower of said cylindrical bores and also having another port communicating with the upper of said cylindrical bores and the other side of the line.

JOHN R. JORDAN.